Figures 1, 2:
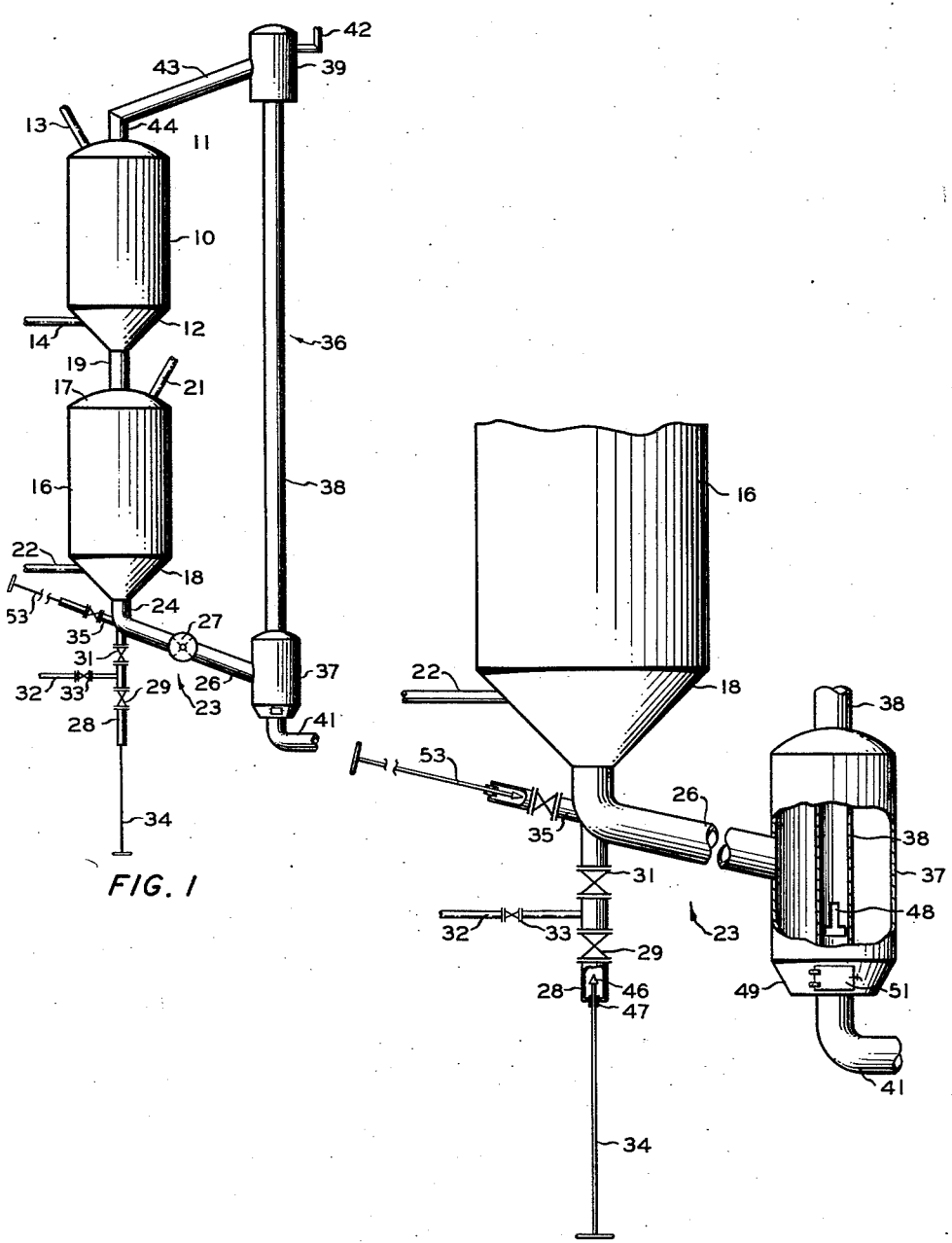

Oct. 8, 1957     D. S. HALL     2,809,102

PEBBLE HEATER APPARATUS

Filed Feb. 23, 1954

INVENTOR.
D.S. HALL
BY Hudson and Young
ATTORNEYS

United States Patent Office 2,809,102
Patented Oct. 8, 1957

2,809,102

PEBBLE HEATER APPARATUS

Dick S. Hall, Phillips, Tex., assignor to Phillips Petroleum Company, a corporation of Delaware Application February 23, 1954, Serial No. 411,646

9 Claims. (Cl. 23—284)

This invention relates to pebble heater apparatus. In one of its more specific aspects, it relates to means for unplugging pebble stoppages in the reactor of pebble heater apparatus. In another of its more specific aspects, it relates to a method for unplugging pebble stoppages in the reactor of pebble heater apparatus.

Apparatus used in carrying out thermal conversion processes wherein a flowing mass of solid heat exchange material, heated to a high temperature by passing hot combustion gas therethrough in a first direct heat exchange relation, is thereafter caused to contact gaseous reactant materials in a second direct heat exchange relation is generally called pebble heater apparatus. Pebble heater apparatus may be advantageously employed in various processes such as hydrocarbon conversion, gas absorption, and gas-solid heat exchange in general. A principal use of pebble heater apparatus is in the conversion of hydrocarbons, involving thermal or catalytic processes such as cracking, hydrogenation, dehydrogenation, isomerization, polymerization, oxidation, and the like.

Solid heat exchange material which is conventionally used in pebble heater apparatus is generally called "pebbles." For a more detailed description of the pebbles which can be utilized herein, reference may be had to U. S. Patent No. 2,536,436.

Conventional pebble heater apparatus usually comprises a series of at least two chambers positioned substantially in vertical alignment with one another. The upper and lower chambers are sometimes referred to, respectively, as the pebble heating chamber and the gas reaction chamber. The pebbles are introduced into the upper portion of the pebble heating chamber where they form a moving bed of solid heat exchange material which flows downwardly through the chamber in direct heat exchange with hot gaseous heat exchange material. The hot gas in contacting the pebble mass transfers heat thereto, the effluent gas being removed thereafter from the upper portion of the heating chamber. Hot pebbles are then passed downwardly from the heating chamber through a pebble throat into the gas reaction chamber where they are contacted in countercurrent flow with gaseous reactant material in a second direct heat exchange relation. Effluent gas from the gas reaction chamber is withdrawn from the top portion thereof while relatively cool pebbles gravitate from the lower portion of that chamber and are subsequently recycled to the top portion of the pebble heating chamber.

One of the outstanding difficulties encountered during the operation of pebble heater apparatus arises from the fact that carbonaceous materials are deposited in the upper portion of the gas reaction chamber and around the gaseous effluent outlet conduit from that chamber. As the carbon deposit or lay-down builds up, the pressure drop through the reaction chamber may reach such proportions that pebbles are carried out of the chamber through the effluent outlet conduit. Another and perhaps even more serious problem which often occurs in pebble heater operation results from the fact that large aggregates of the carbon or coke break loose from the surface of the reaction chamber and gravitate with the pebbles through that chamber and subsequently become lodged in the pebble outlet. When coke lodges in the pebble outlet conduit, flow of pebbles through the pebble heater system is considerably reduced and may be finally brought to a complete standstill. It then becomes necessary to take the apparatus off stream in order to remove the coke from the reaction chamber. The reduction or termination of pebble flow may have several very deleterious effects upon the operation of the pebble heater system. In carrying out a particular hydrocarbon conversion process in a pebble heater reactor, it is necessary for most efficient results that the pebbles flow through the reactor at a uniform fixed rate and that the pebbles entering the reactor be heated to a uniform fixed temperature. If a pebble stoppage occurs in the lower portion of the reactor and causes a decreased rate of pebble flow, pebbles will remain for a longer period of time in the pebble heating chamber. Because of this longer residence time, the pebbles are heated to a higher temperature than that desired for the particular hydrocarbon conversion process being carried out in the reactor. It is thus apparent that the pebbles enter the reactor at a temperature higher than the desired uniform fixed temperature and that the pebbles thereafter flow through the reactor at a slower rate than the desired uniform fixed rate. Because of these undesirable, non-uniform operating conditions, the reactant materials are overreacted and underreacted, resulting in a low rate of product yield. Furthermore, because of the overreaction of the reactant materials, the deposition of carbonaceous materials in the upper portion of the reactor is substantially increased, thereby further aggravating the problem of carbon laydown. In the situation where flow of pebbles through the pebble heater system is terminated, pebbles in the pebble heating chamber of course remain stationary therein and are, therefore, heated to a very high temperature. Such overheating of the pebbles may result in the ruin of the pebbles. It is extremely important in any case but especially so when pebble flow is completely stopped that normal flow of pebbles through the pebble heater system be resumed as soon as possible. In accordance with the present invention, it is possible to clear pebble stoppages which may occur in the reactor of pebble heater apparatus in a minimum of time and without resort to the expensive expedient of taking the apparatus off stream.

The following objects of the invention will be attained by the various aspects of the invention.

It is an object of this invention to provide an improved pebble heater apparatus.

Another object of the invention is to provide means for unplugging pebble stoppages which may occur in the lower portion of the reaction chamber of pebble heater apparatus because of coke or pebble clusters becoming lodged in the pebble outlet therefrom.

Still another object of the invention is to provide a method for clearing pebble stoppages which may occur in the reaction chamber of pebble heater apparatus.

A further object is to provide an elevator system which includes means whereby coke aggregates may be removed from the pebble heater system.

Other and further objects and advantages will become apparent to those skilled in the art upon reference to the accompanying disclosure.

Broadly speaking, the present invention resides in a method and in a device for removing obstructions from the bottom of the reaction chamber of pebble heater apparatus. The aforesaid device comprises a conduit attached to the pebble outlet of the reactor at a point directly below and substantially in axial alignment with the vertical portion of the pebble outlet. The vertical conduit is provided with a pair of valve means and has an inert gas inlet line connected thereto at a point between the two valves. A slidable rod or plunger positioned within the vertical conduit is of such a length that it can be raised through that conduit and the pebble outlet into the lower portion of the reaction chamber.

A more complete understanding of the invention may be obtained by reference to the following description, and the drawing, in which:

Figure 1 is a diagrammatic elevation of pebble heater apparatus of this invention, and Figure 2 is a broken elevational view, partly in section, of the lower portion of the reactor and of the elevator of pebble heater apparatus, illustrating an arrangement of apparatus suitable for practicing the present invention.

Referring particularly to Figure 1 of the drawing, the pebble heater apparatus comprises an upright elongated shell 10 closed at its upper and lower ends by closure members 11 and 12, respectively. Gaseous effluent outlet conduit 13 extends from the upper portion of the pebble heating chamber formed within shell 10 while heating material inlet means 14 is provided in the lower portion of that chamber. Upright elongated shell 16, closed at its upper and lower ends by closure members 17 and 18, respectively, is disposed below shell 10. Pebble conduit means, such as conduit 19, or a plurality of such conduits, extending between closure member 12 of shell 10 and closure member 17 of shell 16, connects the pebble heating chamber with the gas reaction chamber formed within shell 16. Gaseous effluent outlet conduit 21 is disposed in the upper portion of the gas reaction chamber while gaseous material inlet conduit 22 is provided in the lower portion of that chamber.

Pebble outlet conduit 23 which extends downwardly from closure member 18 of the reaction chamber comprises a vertical conduit portion 24 and a laterally extending conduit portion 26. The pebble outlet conduit is provided with a pebble feeder 27 which may be one of the conventional pebble feeders such as a star valve, a gate valve, a rotatable table feeder, or the like. A substantially vertical conduit 28 is connected to vertical conduit portion 24 of pebble outlet conduit 23 so as to be substantially in axial alignment therewith. While conduit portion 24 and conduit 28 are described as being substantially vertical, it is to be understood that such conduits may be otherwise disposed without departing from the scope of the invention. Vertical conduit 28 contains two valve means 29 and 31 which may advantageously be gate valves. Line 32 containing a valve 33 is connected to vertical conduit 28 at a point between valve means 29 and 31 and provides means for introducing an inert gas into vertical conduit 28. A plunger or rod 34 is disposed within vertical conduit 28 as will be explained more in detail in conjunction with Figure 2. A lateral conduit 35 containing a valve means 52, such as a gate valve, may be affixed to the pebble outlet conduit at the junction of vertical conduit portion 24 and laterally extending conduit portion 26 so as to be substantially in axial alignment with the latter conduit portion. Disposed within the lateral conduit, there is a plunger or rod 53, similar to plunger 34.

Elevator 36, which may be of the gas lift type, comprises engaging pot 37, gas lift conduit 38, and disengaging chamber 39. Line 41 provides means for introducing lift gas into the elevator while line 42 is for removal of the gaseous effluent. Laterally extending conduit portion 26 of pebble outlet conduit 23 is connected to engaging pot 37. Pebble conduit 43 extends between disengaging chamber 39 and pebble inlet 44 to the pebble heating chamber.

A clearer understanding of the invention may be obtained by references to Figure 2 in which identical reference numerals have been used to designate elements corresponding to those already described in conjunction with Figure 1. Plunger or rod 34 is fitted with a conical or pyramidal point or end 46 which may be grooved or serrated in order to facilitate breaking up of coke material and pebble clusters. It is apparent that other types of construction which come within the scope of this invention may be employed to perform this function. A packing material 47 is disposed in the lower end of vertical conduit 28 at the point where rod 34 passes therethrough in order to prevent escape of steam around the rod and to serve as a support for the rod. Rod 34 is of such a length that its pointed end extends at least into the lower portion of the reaction chamber above vertical conduit portion 24 when the rod is in its raised position. Plunger or rod 53, which may be of a construction similar to rod 34, is adapted to slide through lateral conduit 35 and into laterally extending conduit portion 26 at least to a point past the junction of that conduit portion with vertical conduit portion 24.

Gas lift conduit 38, the lower end of which is surrounded by engaging pot 37, is provided with a plurality of pebble inlets or openings in its lower portion. One of these pebble inlets, which is illustrated as being in the shape of an inverted T, is designated by reference numeral 48. Pebble inlets having other shapes, e. g., a triangular or a square shape, may be used which come within the contemplation of the invention. As illustrated, the lower portion 49 of the engaging pot is substantially in the shape of an inverted truncated cone. A coke port covered by a hinged door 51 is provided in the conical portion of the engaging pot at a point under pebble inlet 48. While only one coke port has been illustrated, it is preferred to utilize such a port below each of the pebble inlets 48.

In the operation of the apparatus of Figures 1 and 2, pebbles are heated in the pebble heating chamber formed within shell 10 by contact with hot gaseous heat exchange material which may result from the combustion of fuel outside the heating chamber or in the lower portion of that chamber in a combustion zone separated from the pebble mass, or by burning a fuel in direct contact with the pebble mass within the chamber. Pebbles are introduced into the pebble heating chamber through pebble inlet 44 and form a contiguous gravitating mass which extends downwardly through shell 10, pebble conduit 19, shell 16, and pebble outlet conduit 23 to pebble feeder 27. The pebbles are heated in the pebble heating chamber to temperatures in the approximate range of 1200° F. to 3200° F., depending upon the particular reaction being carried out within the pebble heater apparatus. The hot pebbles are gravitated through conduit 19 into the upper portion of the gas reaction chamber formed within shell 16. Usually the temperature of the pebbles entering the reaction chamber are about 100° F. to 500° F. below the average temperature of the combustion gases within the heating chamber. Gaseous reactant materials introduced into the reaction chamber through inlet conduit 22 contact the gravitating mass of hot pebbles and undergo reaction. The product-containing gas is withdrawn through gaseous effluent outlet conduit 21 and thereafter passed to quenching means and a purification system, not shown. The cooled pebbles flow from the bottom of the reaction chamber through pebble outlet conduit 23 and pass therethrough into engaging pot 37 at a rate dependent upon the operation of the pebble feeder means employed. In the engaging pot, the pebbles contact the stream of lift gas, such as air, which is introduced into the lower end thereof through lift gas inlet ilne 41. The pebbles are raised by the air stream through gas lift conduit 38 to the top of the elevator where the pebbles fall out of the air stream in disengaging chamber 39 and pass down pebble conduit 43 to pebble inlet 44 through which the pebbles enter the pebble heating chamber. The air is withdrawn from disengaging chamber 39 through gaseous effluent conduit 42.

During the operation of the pebble heater apparatus as described above, carbonaceous materials may tend to deposit in the upper portion of the gas reaction chamber and around the gaseous effluent outlet conduit. Such deposition occurs primarily during periods of non-uniform operating conditions as, for example, where the pebble temperature and pebble flow rate are at variance with those desired for the particular conversion reaction being carried out. As the carbon laydown continues to build up, large aggregates or chunks of the carbon or coke break loose from the surface of the reaction chamber and gravitate therethrough with the pebbles towards the pebble outlet. When the coke material reaches the pebble outlet, it has a tendency to lodge therein and thereby reduces or completely terminates the flow of pebbles through the pebble heater apparatus. Furthermore, the very pebbles themselves because of carbon formed thereon may have a tendency to agglomerate and form comparatively large masses or clusters of pebbles which may lodge in and plug the pebble outlet. When such material lodges in the pebble outlet causing a pebble stoppage as indicated by a decrease in or even a termination of flow of pebbles through the pebble heater system, valve 33 in line 32 is opened, thereby allowing an inert gas, such as steam, to enter vertical conduit 28. After the pressure within conduit 28 has built up, preferably to at least 75 p. s. i. g., valve means 31 is opened, permitting the steam to pass through the upper valve means at a high velocity into the lower portion of the reactor through vertical conduit portion 24. Pebbles in vertical conduit 28 above valve means 31 and in vertical conduit portion 24 are thereby fluidized and blown upwardly into the lower portion of the reaction chamber. While still maintaining the supply of steam to vertical conduit 28, the lower valve means 29 is next opened, making it possible to raise plunger or rod 34 through vertical conduit 28 and vertical conduit portion 24 into the lower portion of the reaction chamber. By continuing to supply steam to vertical conduit 28 during this operation, rod 34 can be easily raised into the lower portion of the reaction chamber. Furthermore, the steam exerts an upward force which tends to move the obstruction away from the pebble outlet and thereby assists the rod in clearing the pebble stoppage. By properly manipulating the rod, the pebble clusters and/or coke materials can be broken up or turned so that they may pass downwardly through pebble outlet conduit 23. The movement of and the breaking up of the pebble clusters and coke material is facilitated by providing rod 34 with a conical or pyramidal end 46. When the pebble stoppage has been cleared as indicated by normal flow of pebbles through the pebble heater system, rod 34 is pulled down into the lower part of conduit 28. Upper valve means 31 and lower valve means 29 are thereafter closed in sequence after which the supply of steam to conduit 28 is terminated by closing valve 33.

In some instances, it may happen that resumption of normal pebble flow does not occur even after clearing the pebble stoppage as described above. Such a condition indicates that the coke material has become lodged in pebble outlet conduit 23, probably at the junction of vertical conduit portion 24 and laterally extending conduit portion 26. To clear this type of stoppage, valve means 52 is opened, and plunger or rod 53 is moved through lateral conduit 35 into pebble outlet conduit 23. By means of rod 53, the coke material can be broken up and turned so that it may pass downwardly through the pebble outlet conduit.

As previously explained, the coke material is broken up or so turned in the lower portion of the reaction chamber through the operation of rod 34 that it will pass downwardly through vertical conduit portion 24 and through laterally extending conduit portion 26 into engaging pot 37. It is apparent that if a large amount of coke is allowed to accumulate in the engaging pot the elevator system will in time become inoperative. The engaging pot is, therefore, provided with at least one coke port whereby such materials may be entirely removed from the pebble heater system. In removing such coke material, door 51 is opened and pebbles are allowed to drain therethrough until the coke reaches the bottom of the engaging pot. At this point, the coke can be easily removed through the coke port. The presence of coke in the engaging pot becomes objectionable when it tends to block pebble inlets 48 and thereby impedes flow of pebbles therethrough. After clearing an obstruction in the lower portion of the reaction chamber, it becomes necessary, therefore, to drain the engaging pot only when normal flow of pebbles through the pebble heater system does not resume, thereby indicating that pebble inlets 48 have been probably blocked by the very coke material removed from the lower portion of the reaction chamber.

It will be apparent that in accordance with the present invention an efficient and practical means is provided for clearing pebble stoppages which may occur in the lower portion of the gas reaction chamber of pebble heater apparatus. By operating in the described manner, it becomes unnecessary to take the pebble heater system off stream in order to clear such stoppages, thereby effecting a material saving in operating costs. While the present invention has been illustrated and described with relation to a particular pebble heater reactor, it is to be understood that it is not intended to limit the invention to the particular apparatus described, but rather it is applicable to other types of reactors. Furthermore, in the light of the instant disclosure, it becomes apparent that other installations may be provided with the device of the instant invention in order to clear stoppages resulting from solid materials becoming lodged therein.

As will be evident to those skilled in the art, various modifications of this invention may be made or followed in the light of the foregoing disclosure and description without departing from the spirit or scope of the disclosure.

I claim:

1. An improved reactor for pebble heater apparatus which comprises, in combination, an upright elongated enclosed shell; pebble inlet means in the upper end of said shell; gaseous effluent outlet conduit means in the upper portion of said shell; fluid inlet means in the lower portion of said shell; pebble outlet means in the lower portion of said shell; conduit means connected to said pebble outlet means; means for introducing inert gas into said conduit means; and plunger means disposed in said conduit means, said plunger means being adapted to extend upwardly into the lower portion of said shell when said plunger means is in a raised position.

2. An improved reactor for pebble heater apparatus which comprises, in combination, an upright elongated enclosed shell; pebble inlet means in the upper end of said shell; gaseous effluent outlet conduit means in the upper portion of said shell; fluid inlet means in the lower portion of said shell; a pebble outlet in the lower portion of said shell; a conduit connected to said pebble outlet, said conduit containing a first and a second valve means; an inert gas inlet line connected to said conduit at a point between said first and second valve means; and a slidable plunger rod mounted in said conduit, said rod being adapted to extend upwardly into the lower portion of said shell when said rod is in a raised position.

3. An improved reactor for pebble heater apparatus which comprises, in combination, an upright elongated enclosed shell; pebble inlet means in the upper end of said shell; gaseous effluent outlet conduit means in the upper portion of said shell; fluid inlet means in the lower portion of said shell; pebble outlet conduit means comprising a vertical conduit portion having one of its ends attached the lower portion of said shell and a laterally extending conduit portion attached to the other end of said vertical conduit portion; a substantially vertical conduit connected to said vertical conduit portion and in axial alignment therewith; a first and a second valve means in said vertical conduit; an inert gas inlet line containing a valve means, said line being connected to said vertical conduit at a point between said first and second valve means; and a slidable plunger rod disposed in said vertical conduit, said rod being adapted to extend into the lower portion of said shell when said rod is in a raised position.

4. Pebble heater apparatus which comprises, in combination, an upper chamber having a pebble inlet and a gaseous effluent outlet in its upper portion; a first fluid inlet in the lower portion of said upper chamber; a lower chamber having a gaseous effluent outlet in its upper portion; a second fluid inlet in the lower portion of said lower chamber; a pebble conduit extending between the bottom portion of said upper chamber and the upper portion of said lower chamber; pebble outlet conduit means comprising a vertical conduit portion having one of its ends attached to the lower portion of said lower chamber; a pebble elevating means comprising a lower pebble engaging chamber and an upper pebble disengaging chamber, said chambers being connected by a substantially upright pebble conduit; a laterally extending conduit extending between the other end of said vertical conduit portion and said engaging chamber; at least one coke port in the lower portion of said engaging chamber; a substantially vertical conduit connected to said vertical conduit portion and in axial alignment therewith; a first and a second valve means in said vertical conduit; an inert gas inlet line containing a valve means, said line being connected to said vertical conduit at a point between said first and second valve means; a slidable plunger rod disposed in said vertical conduit, said rod being adapted to extend into the lower portion of said lower chamber when said rod is in a raised position; and a pebble conduit extending between said disengaging chamber and said pebble inlet in the upper portion of said upper chamber.

5. The apparatus of claim 4 in which a lateral conduit is affixed to said pebble outlet means at the junction of said vertical conduit portion and said laterally extending conduit, said lateral conduit being in axial alignment with said laterally extending conduit and having a slidable plunger rod disposed therein adapted to extend into said laterally extending conduit.

6. In an improved method of operating pebble heater apparatus wherein pebbles are passed into the upper portion of a pebble heating chamber and downwardly therethrough as a fluent contiguous mass; a first fluid heat exchange material is passed into the lower portion of said heating chamber and upwardly therethrough in direct heat exchange with said pebbles; effluent material is removed from the upper portion of said heating chamber; said pebbles are gravitated from the lower portion of said heating chamber into the upper portion of a reaction chamber; a second fluid heat exchange material is passed into the lower portion of said reaction chamber and upwardly therethrough in direct heat exchange with said pebbles; effluent material is removed from the upper portion of said reaction chamber; and said pebbles are gravitated from the lower portion of said reaction chamber and thereafter raised to the upper portion of said heating chamber; and wherein solid materials comprising agglomerated pebble clusters and coke aggregates become lodged in the lower portion of said reaction chamber, thereby obstructing flow of pebbles therefrom, the improvement which comprises introducing an inert gas at a high velocity into the lower portion of said reaction chamber, thereby fluidizing the pebbles in the lower portion of said reaction chamber and exerting an upward force against the solid materials lodged therein; inserting a plunger into the lower portion of said reaction chamber while continuing the supply of said nert gas thereto; manipulating said plunger so as to break up and move said solid materials so that they may be passed from said reaction chamber; and removing said solid materials from the lower portion of said reaction chamber, thereby permitting free flow of pebbles therethrough.

7. The apparatus of claim 3 in which a lateral conduit is affixed to said pebble outlet means, said lateral conduit being in axial alignment with said laterally extending conduit and having a slidable plunger rod disposed therein adapted to extend into said laterally extending conduit.

8. In pebble heater apparatus comprising, in combination, an upper and a lower enclosed chamber disposed substantially in vertical alignment with one another and pebble elevating means comprising a lower pebble engaging chamber and upper pebble disengaging chamber connected by a substantially upright pebble conduit, said disengaging chamber being connected to the upper end portion of said upper chamber by a pebble inlet conduit means and said engaging chamber being connected to the lower end portion of said lower chamber by a pebble outlet conduit means, the improvement which comprises conduit means connected to said pebble outlet means; means for introducing inert gas into said conduit means; and a plunger disposed in said conduit means, said plunger being adapted to extend into the lower portion of said lower chamber when said plunger is in a raised position.

9. The apparatus of claim 8 in which said engaging chamber is provided with at least one coke port in its lower portion.

References Cited in the file of this patent

UNITED STATES PATENTS

| 2,020,241 | Dimmig | Nov. 5, 1935 |
| 2,241,560 | Schouler | May 13, 1941 |
| 2,624,695 | Ivey et al. | Jan. 6, 1953 |
| 2,676,909 | Bethea | Apr. 27, 1954 |